(12) United States Patent
Ziecina et al.

(10) Patent No.: US 11,060,405 B2
(45) Date of Patent: Jul. 13, 2021

(54) TURBINE ENGINE WITH A SWIRLER (71) Applicant: General Electric Company, Schenectady, NY (US)

(72) Inventors: Pawel Ziecina, Warsaw (PL); Shiladitya Mukherjee, West Chester, OH (US); Jaroslaw Weronko, Warsaw (PL); Marcin Krzysztof Wachulec, Chieri (IT); Daniel Tyler Jarboe, West Chester, OH (US); Michal Truszczynski, Jozefow (PL); Piotr Michalec, Borowie (PL); Pawel Trzepiota, Warsaw (PL); Douglas Marti Fortuna, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 127 days.

(21) Appl. No.: 16/098,515

(22) PCT Filed: May 18, 2017

(86) PCT No.: PCT/US2017/033237
§ 371 (c)(1),
(2) Date: Nov. 2, 2018

(87) PCT Pub. No.: WO2018/026413
PCT Pub. Date: Feb. 8, 2018

(65) Prior Publication Data
US 2020/0157940 A1 May 21, 2020

(30) Foreign Application Priority Data

May 25, 2016 (PL) .......................................... 417315

(51) Int. Cl.
*F01D 5/14* (2006.01)

(52) U.S. Cl.
CPC ............ *F01D 5/14* (2013.01); *F05D 2220/30* (2013.01); *F05D 2240/127* (2013.01); *F05D 2260/14* (2013.01)

(58) Field of Classification Search
CPC .......... F01D 5/14; F01D 5/81; F05D 2220/30; F05D 2240/127; F05D 2260/14; F05D 2260/96; F02C 7/12; Y02T 50/676
See application file for complete search history.

(56) References Cited

U.S. PATENT DOCUMENTS 3,565,545 A * 2/1971 Bobo ...................... F01D 5/081
416/90 R
4,541,744 A * 9/1985 Lederman ............ B60G 15/068
384/607

(Continued)

FOREIGN PATENT DOCUMENTS

GB         2075123 A      11/1981

OTHER PUBLICATIONS

International Search Report and Written Opinion dated Apr. 5, 2018 which was issued in connection with PCT application No. PCT/US17/33237 which was filed on May 18, 2017.

*Primary Examiner* — Justin D Seabe
*Assistant Examiner* — Ryan C Clark
(74) *Attorney, Agent, or Firm* — McGarry Bair PC (57) ABSTRACT

An apparatus and method for a turbine engine including an engine core having a compressor section, a combustor, and a turbine section, which are arranged to define a stator and rotor. The engine further includes a swirler to increase the rotational speed of the air leaving the stator and entering the interior of the rotor.

16 Claims, 7 Drawing Sheets

(56) References Cited

U.S. PATENT DOCUMENTS

| | | | | |
|---|---|---|---|---|
| 4,541,774 | A | * | 9/1985 | Rieck ............... F01D 5/085 |
| | | | | 415/115 |
| 4,807,433 | A | * | 2/1989 | Maclin ............... F02C 7/18 |
| | | | | 60/795 |
| 4,882,902 | A | * | 11/1989 | Reigel ............... F01D 5/082 |
| | | | | 60/806 |
| 5,373,691 | A | | 12/1994 | Gardner et al. |
| 5,491,308 | A | | 2/1996 | Napier et al. |
| 6,398,487 | B1 | | 6/2002 | Wallace et al. |
| 6,540,477 | B2 | * | 4/2003 | Glynn ............... F01D 5/081 |
| | | | | 415/115 |
| 6,923,005 | B2 | | 8/2005 | Casoni |
| 7,442,006 | B2 | | 11/2008 | Nguyen et al. |
| 8,172,506 | B2 | * | 5/2012 | Pieczka ............. F01D 5/082 |
| | | | | 415/115 |
| 9,790,793 | B2 | | 10/2017 | Jung |
| 2002/0076318 | A1 | * | 6/2002 | Patel ............... F01D 5/081 |
| | | | | 415/115 |
| 2011/0247345 | A1 | | 10/2011 | Laurello |
| 2015/0275690 | A1 | * | 10/2015 | McCaffrey ......... F01D 11/025 |
| | | | | 416/1 |

\* cited by examiner

TURBINE ENGINE WITH A SWIRLER

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines utilize mainstream flow to drive the rotating turbine blades to generate thrust. The mainstream flow is propelled by combustion of gas to increase the thrust generated by the engine. The combustion of gas generates excessive temperatures within the engine which require cooling. Such cooling can be accomplished by providing air from the mainstream flow and bypassing the combustor.

Air bypassing the combustor moves in a substantially axial flow. In order to minimize losses from the substantially axial flow as it comes into contact with a rotating rotor, a swirler, such as an inducer, can turn the bypass flow to have a tangential component. The tangentially moving airflow reduces the losses associated with the rotating rotor, however, can generate harmonic vibration within the engine that can resonate. Such harmonic excitation has been linked to high pressure turbine problems.

BRIEF DESCRIPTION OF THE INVENTION

In one aspect, embodiments of relate to a turbine engine including an engine core having a compressor section, a combustor section, and a turbine section in axial arrangement and defining an engine centerline, and which are operably separated into a stator fixed about the centerline and a rotor rotatable about the centerline. The turbine engine further includes a first swirler provided on the stator for inducing rotating of an airflow passing through the engine core, and a second swirler disposed on the rotor, downstream of and in fluid communication with the swirler, for reducing the rotational speed of the airflow from the swirler.

In another aspect, embodiments relate to a turbine engine including a compressor section and a turbine section in axial arrangement and defining a stator and a rotor. A first swirler is provided with the stator for inducing a rotation on an airflow, and a second swirler provided with the rotor downstream of the swirler for changing the rotational speed of the airflow provided from the first swirler.

In yet another aspect, embodiments relate to a method of swirling a fluid within a turbine engine including swirling the fluid from a static portion of the turbine engine into a rotor portion of the turbine engine at a speed greater than the rotation of the rotor to define a swirled flow, and deswirling the swirled flow within an interior of the rotor to maintain a predetermined tangential Mach number at a first stage of a high pressure turbine.

DESCRIPTION OF EMBODIMENTS OF THE INVENTION

The described embodiments of the present invention are directed to a swirler mounted to a rotor of a turbine engine forward of a turbine section of the engine to reduce rotational speed of fluid provided to the first stage of the turbine section. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
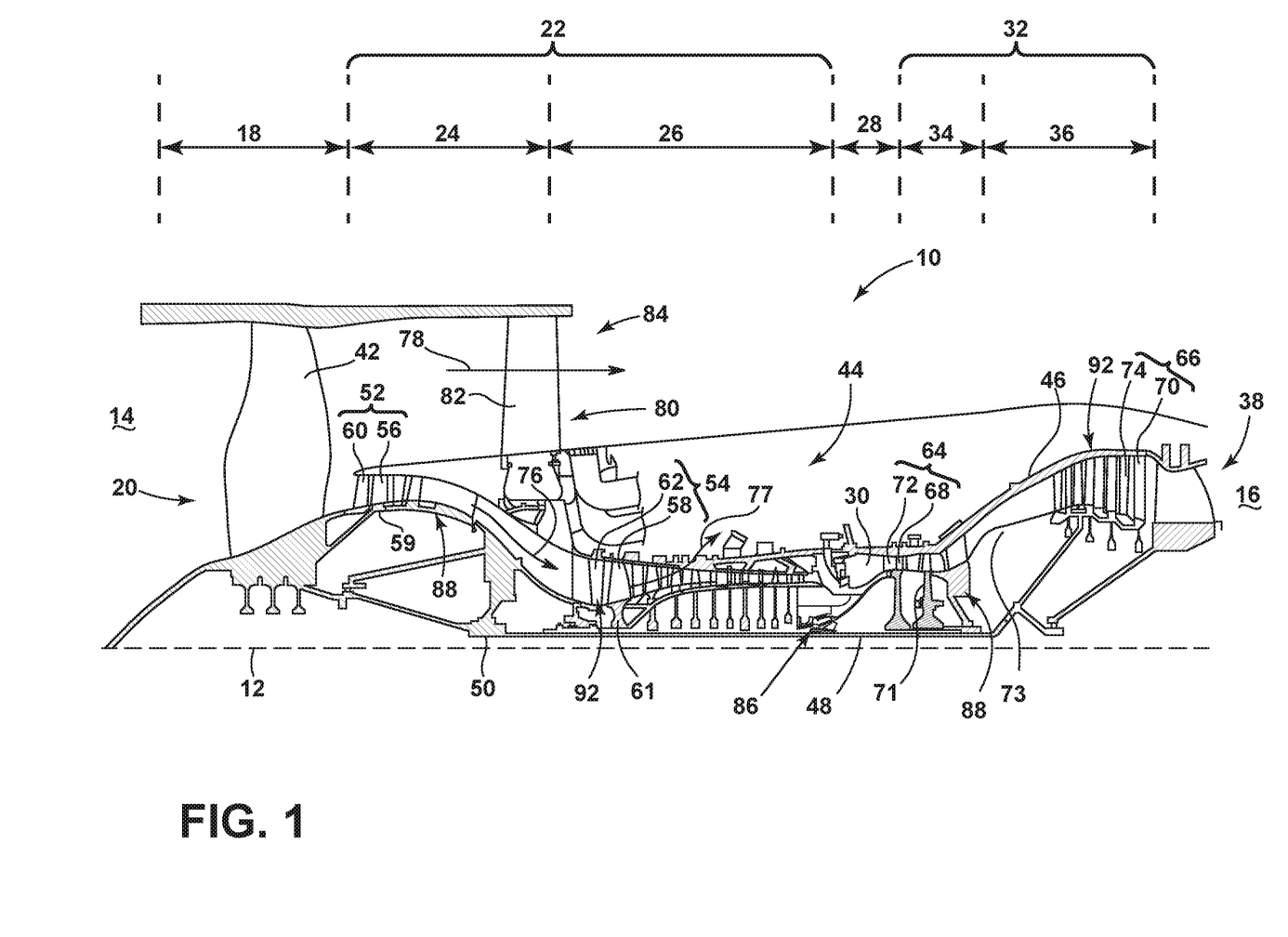
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 88. The stationary portions of the engine 10 including portions mounted to the core casing 46 are also referred to individually or collectively as a stator 92.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

The rotor 88 includes all of the elements of the engine core 44 that rotate, such as the HP spool 48, disks 71, blades 56, 58, 68, 70, and any other rotating parts in non-limiting examples. Such rotatable parts are, in general, used for driving the rotating blades 68 for moving a volume of air through the engine 10.

The stator 92 includes elements of the engine core 44 that do not rotate, such as support vanes 62, mounts, and other non-rotating elements in non-limiting examples.

It should be understood that some elements of the compressor section 22, the combustion section 28, and the turbine section 32 form the rotor 88 and other elements of the compressor section 22, combustion section 28, and the turbine section 32 form the stator. The stator 92 can be complementary to the rotor 88, positioning the non-rotating elements adjacent the rotating elements of the rotor 88 in order to efficiently provide a flow of air driven by the engine core 44.

The engine 10 further includes a swirler section 86. The swirler section 86 can be disposed between the compressor section 22 and the turbine section 32, being fed with a flow of fluid bypassing the combustor 30. The swirler section 86 induces a swirl on the flow of fluid.

Figure 2:
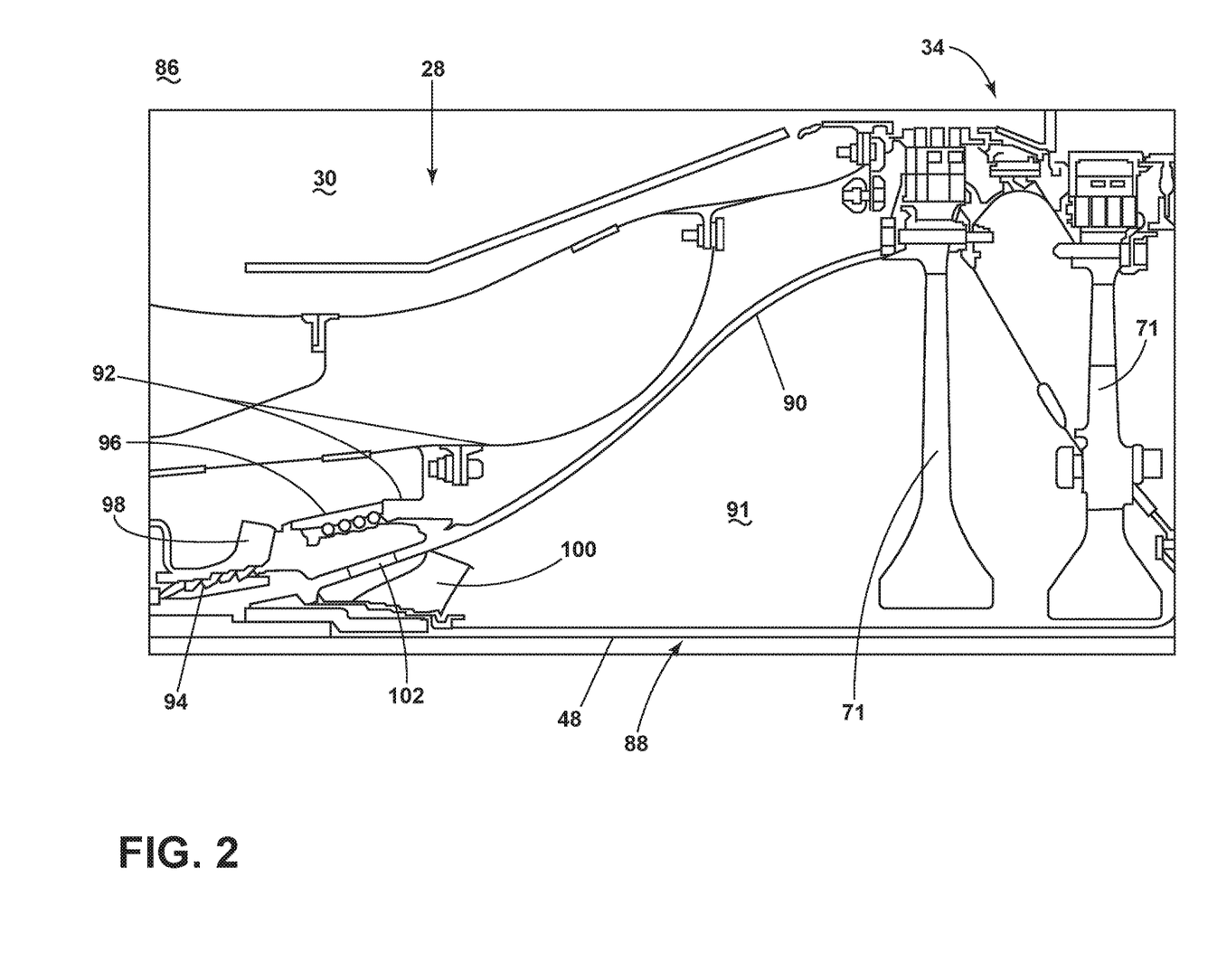
FIG. 2 is an enlarged view of a portion of the turbine engine of FIG. 1 illustrating a first swirler in a stator of the gas turbine engine and a second swirler in a rotor of the gas turbine engine.

FIG. 2 illustrates an enlarged view of the swirler section 86. A rotatable shaft 90, which can be the high pressure turbine shaft couples to the forward-most disk 71 and can rotate with the disk 71 during engine operation. The shaft 90 defines a bypass chamber 91 adjacent to the disks 71. The swirler section 86 includes a first seal 94 and a second seal 96. The stator 92 meets the rotor 88 at the first seal 94 and the second seal 96.

A first swirler 98 is disposed between the first and second seals 94, 96. The first swirler 98 mounts to the stator 92 and is non-rotating. The first swirler 98 induces rotation of an airflow passing through the first swirler 98, such as a bypass airflow. A first example for the first swirler 98 can be a ring having a plurality of fixed vanes to turn the airflow from being substantially axial to including a tangential component. Another example of the first swirler 98 can be an inducer, having a plurality of dedicated flow paths to turn the airflow passing through the inducer.

It should be understood that the swirling airflow generated by the first swirler 98 is both a circumferential and axial airflow, passing circumferentially around the engine 10 while moving axial in the aft direction. The swirling airflow can be represented by the component of the airflow, which is tangential to the rotation direction, which is referred to as a tangential airflow can be quantified in terms of a Tangential Mach Number indicating the rotational speed of the airflow generated by the first swirler 98. Such a Mach number is a function of the speed of sound in the swirling air. Additionally, the Tangential Mach Number can be a function of the radial distance the flow is from the engine centerline.

A second swirler 100 is disposed downstream from and in fluid communication with the first swirler 98. The second swirler 100 is mounted to the rotor 88 and is a rotating element. More specifically, the second swirler 100 can mount to the HP spool 48 to rotate about the engine centerline 12. The second swirler 100 is separated from the first swirler 98 by the shaft 90. A plurality of apertures 102 can be disposed in the shaft 90 between the first swirler 98 and the second swirler 100. The first swirler 98 is in fluid communication with the second swirler 100 through the apertures 102. The second swirler 100 reduces the Tangential Mach Number, or rotational speed of the airflow from the first swirler 98 as it enters the bypass chamber 91.

In one particular example, the second swirler 100 can be a deswirler, as the deswirler reduces the Tangential Mach Number, or rotational speed of the airflow passing through the second swirler 100. Alternatively, the second swirler 100 can be a swirler similar to the first swirler 98, increasing the Tangential Mach Number or rotational speed of the airflow moving through the second swirler 100.

Figure 3:
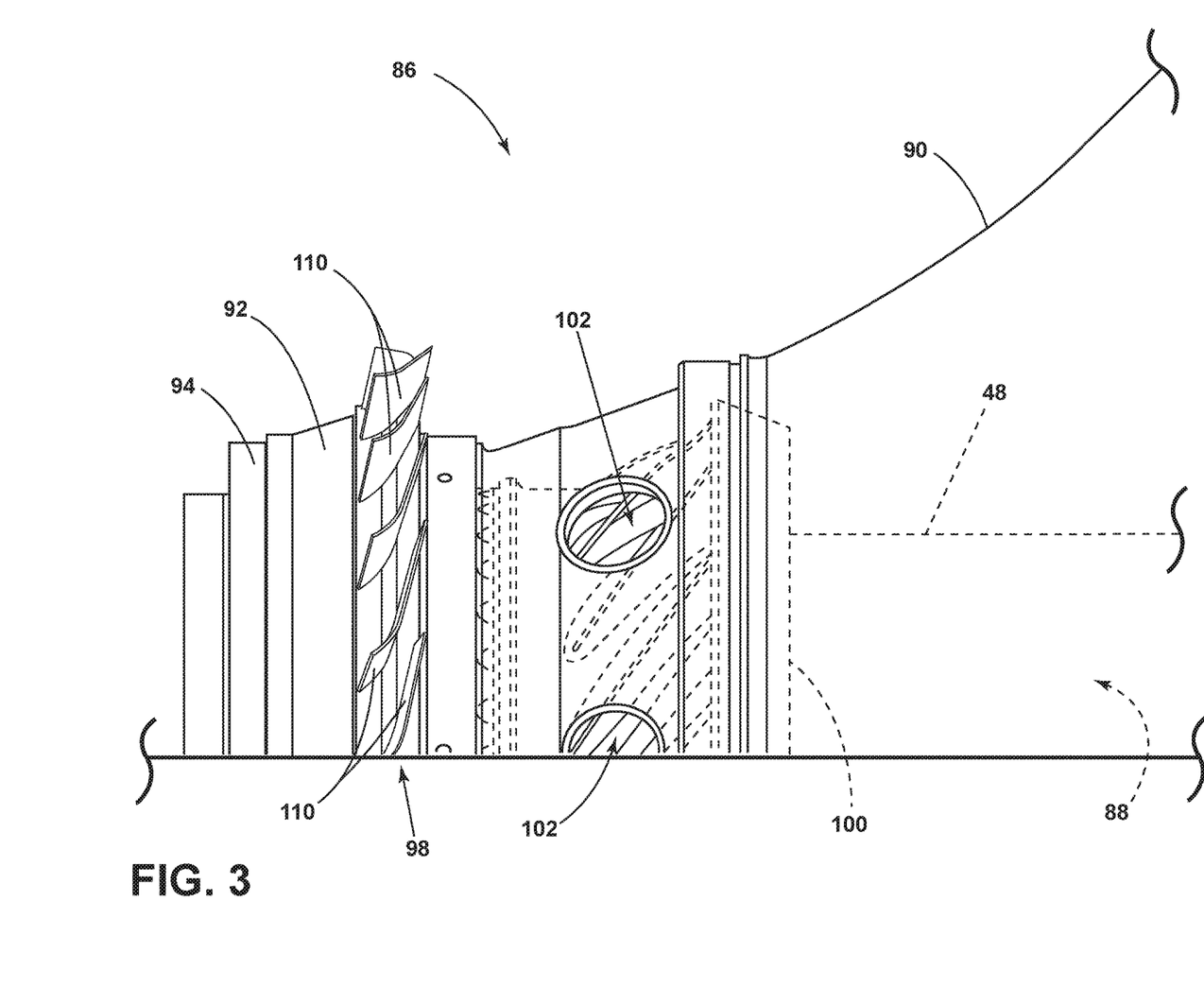
FIG. 3 is a view of the first and second swirlers of FIG. 2 having a case with a plurality of apertures disposed between the first and second swirlers.

Referring to FIG. 3, the first swirler 98 includes a plurality of circumferentially spaced static vanes 110. The vanes 110 turn an airflow from having an axial direction to having both an axial and a tangential component to the airflow. Downstream from the first swirler 98 is the shaft 90, having the apertures 102 circumferentially arranged on the shaft 90 fluidly coupling the first swirler 98 to the second swirler 100. The cross-sectional area of the apertures 102 as well as the number of apertures 102 can be used to selectively control the airflow rate provided to the second swirler 100 from the first swirler 98. The first seal 94 is disposed under the first swirler 98, sealing the airflow at the junction between the rotating shaft 90 and the first swirler 98.

Figure 4:
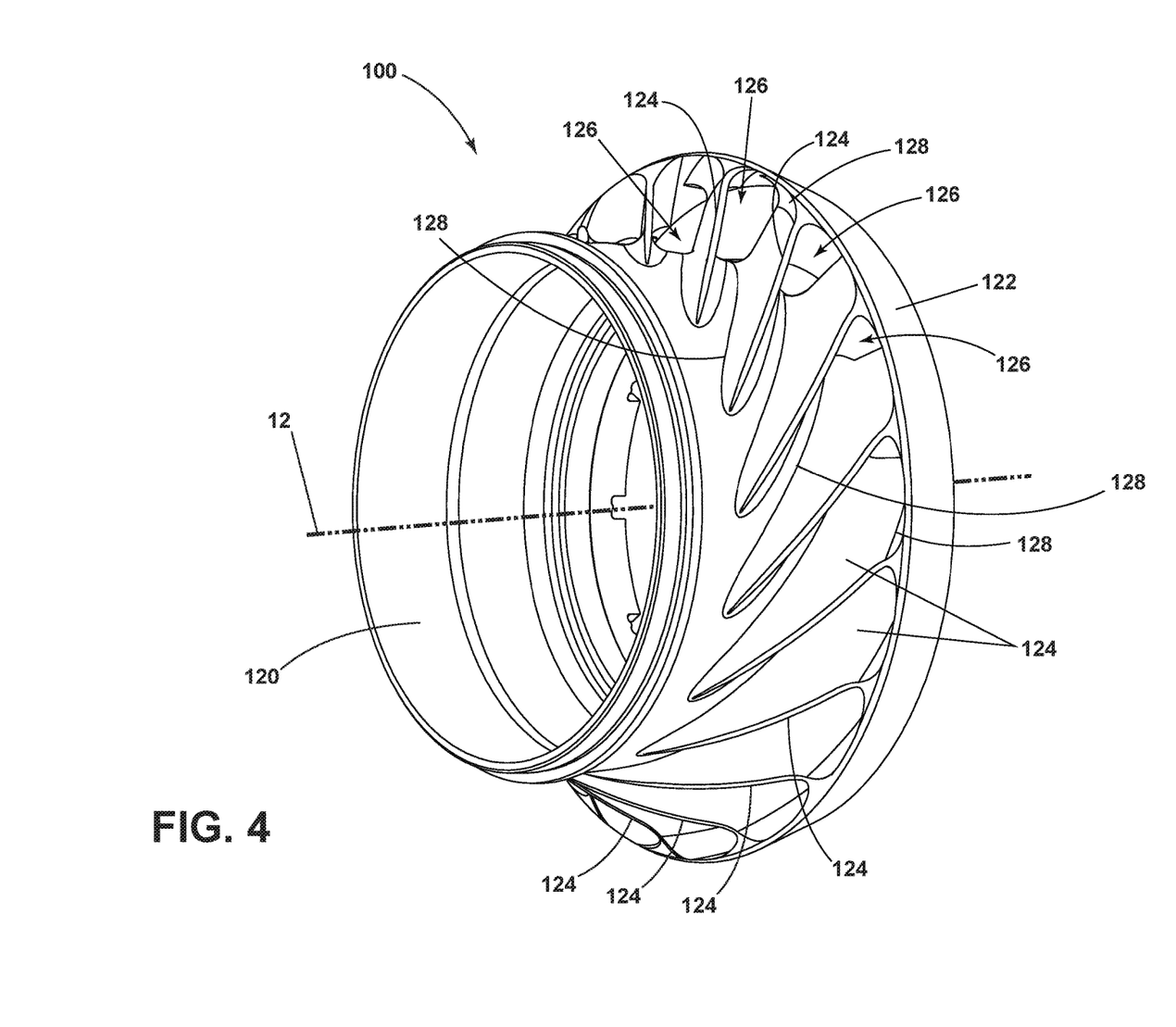
FIG. 4 is a perspective view of the second swirler of FIG. 2.

Referring now to FIG. 4, the second swirler 100 includes an inner band 120 and an outer band 122. The inner band 120 can mount to the HP spool 48 to rotate the second swirler 100, while the outer band 122 can provide a radially exterior terminal surface for the second swirler 100. A plurality of circumferentially spaced blades 124 mount between the inner and outer bands 120, 122. The blades 124 can be mounted to the bands 120, 122, such as by welding, or can be integrally formed with the bands 120, 122, such as by casting in one non-limiting example.

The blades 124 can be plate-like, being flat and linear, defining a plurality of linear passages 126 between each adjacent blade 124. The blades 124 can further include a radiused corner, such as a fillet 128, at the junction between the blades and the inner and outer bands 120, 122. The blades 124 are disposed at an angle such that rotation of the second swirler 100 imparts a tangential speed on the airflow passing through the second swirler 100. By varying the number of blades 124 and the disposition of the same, the Tangential Mach Number of the airflow provided by the blades 124 can be controlled.

Alternatively, the blades 124 can be non-linear. Such blades 124 can be arcuate or curved to reduce the rotational speed of the airflow passing through the second swirler 100. Such an orientation may be advantageous based upon the rotational speed of the second swirler 100, where a linear blade may be less efficient. In another example, the blades 124 need not be flat or plate-like, and can be airfoil-shaped in one non-limiting example, further improving efficiency.

Figure 5:
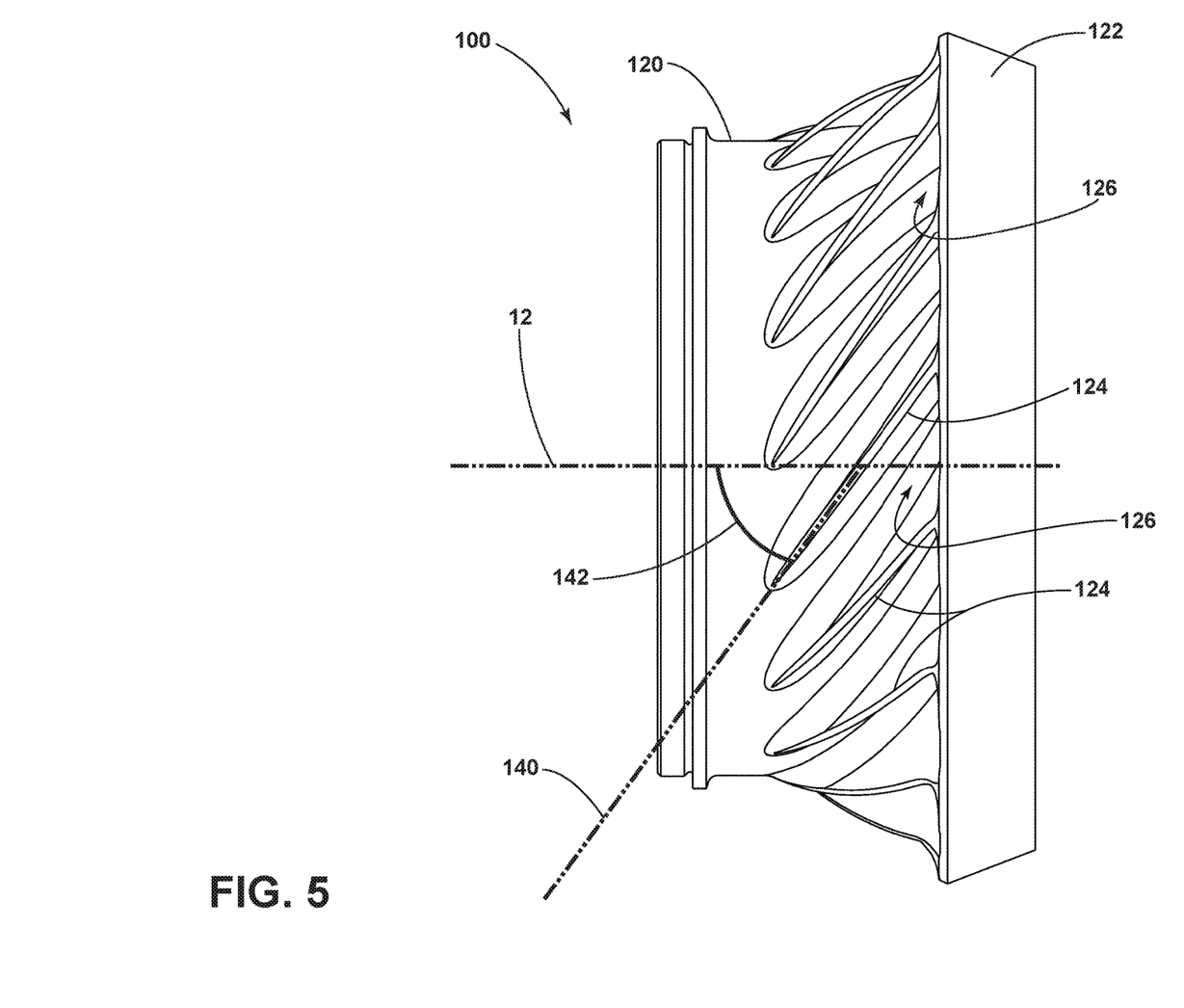
FIG. 5 is a side view of the second swirler of FIG. 2.

Referring now to FIG. 5, using the flat, linear blades 124 as an example, the blades 124 can be disposed at an angle to determine the Tangential speed component of the airflow passing through the second swirler 100. A blade axis 140 can be defined longitudinally along the linear blades 124. A blade angle 142 can be defined by the blade axis 140 relative to the engine centerline 12. The blade angle 142 can be between 30 degrees and 75 degrees, such as 60 degrees in a non-limiting example, while a greater range of angles is contemplated.

It should be understood that the blade angle 142 can orient the blades 124 to deswirl a flow of air passing through the second swirler 100, with the second swirler 100 functioning as the deswirler. Deswirling the flow of air reduces the tangential speed of the air passing through the second swirler 100. The blade angle 142 can be adapted to achieve a particular tangential speed for the air passing through the second swirler 100. For example, angling the blades 124 at about 30 degrees can significantly reduce the tangential speed of the air passing through the second swirler 100 to operate as the deswirler. In another example, angling the blades at about 60 degrees can only slightly reduce the tangential speed of the air moving through the second swirler 100 to also function as a deswirler. It is also contemplated that the second swirler 100 can increase the tangential speed of the airflow. For example, angling the blades 124 at a blade angle 142 of about 75 degrees can increase the tangential speed component of the airflow passing through the second swirler 100, operating as a swirler downstream of the first swirler 98. As such, it should be understood that it is contemplated that the second swirler 100 can increase or decrease the tangential speed of the airflow passing through the second swirler 100 as a function of the blade angle 142.

Figure 6:
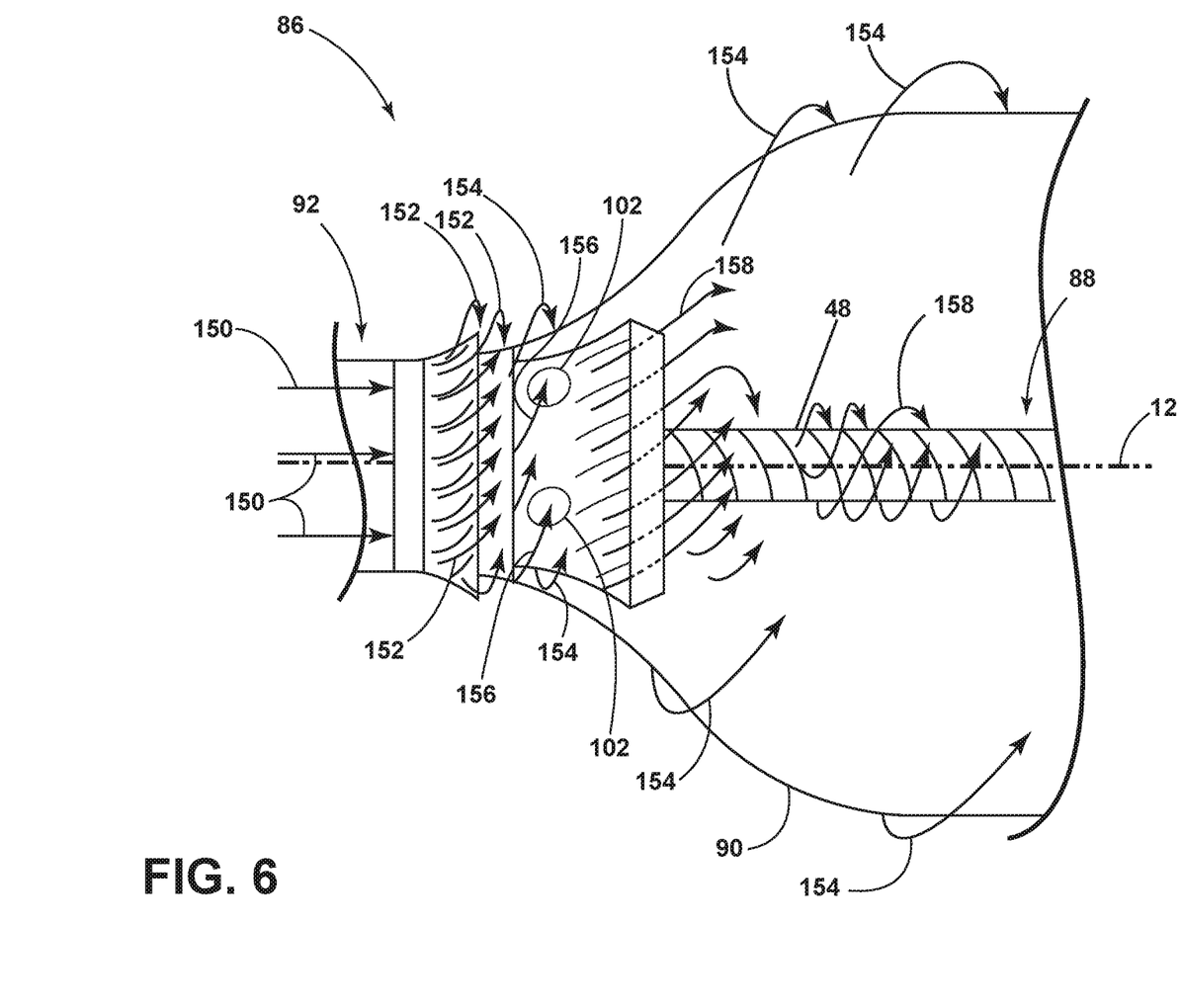
FIG. 6 is a side view of a swirler section illustrating the airflow passing from the second swirler.

The operation of the turbine engine 10, especially the first swirler 98 and second swirler 100, will be described with respect to FIG. 6, which illustrates a flow of air bypassing the combustor 30 can be provided to the first swirler 98 as a bypass airflow 150. The bypass airflow 150 can be moving in a substantially axial direction. The bypass airflow 150 passes through the first swirler 98 and turns, having both a circumferential and axial component as swirling airflow 152. The swirling airflow 152 can swirl circumferentially around the engine centerline 12 defining a Tangential Mach Number. The Tangential Mach Number for the swirling airflow 152 is function of the speed of sound in air, defined tangentially to the rotational direction of the airflow. In one example, the tangential speed of the swirling airflow 152 can be about two times higher than the rotor 88 circumferential speed. Similarly, the tangential speed induced by the first swirler 98 can be between 80-300% of the rotational speed of the rotor 88, for example.

The swirling airflow 152 can be separated into two airflows by the shaft 90, as a HP turbine airflow 154 and a rotor airflow 156. The HP turbine airflow 154 remains radially outside of the shaft 90, being provided to the first stage of the HP turbine 34 (FIG. 1) such as for preventing hot gas ingestion or utilized for engine component cooling. Such rotational speed of the HP turbine airflow 154 requires a higher Tangential Mach Number to maintain proper engine efficiency for interacting with or being provided to the mainstream airflow passing through the engine core 44 (FIG. 1).

The remaining portion of the swirling airflow 152 as the rotor airflow 156 passes through the apertures 102 in the shaft 90 and is provided to the second swirler 100. The second swirler 100 reduces rotational speed of the swirling rotor airflow 156 as a deswirled airflow 158. Alternatively, it should be appreciated that the second swirler 100 can further increase the rotational speed of the swirling rotor airflow 156. The blades 124 are oriented at a particular blade angle 142 to turn the swirling airflow 152, to reduce or control the Tangential Mach Number of the swirling airflow 152 as the deswirled airflow 158. The deswirled airflow 158 includes a swirling airflow tangential speed component to be closer to rotational speed of the rotor 88. In one example, the deswirled airflow 158 can have a Tangential Mach Number less than 0.40. In alternate examples, the Tangential Mach Number for the deswirled airflow 158 can be less than a predetermined threshold Tangential Mach Number. The threshold Tangential Mach Number is a known value based upon the engine geometry and is independent of the rotational speed of the rotor 88 or the particular engine core 44. Such a threshold can be 0.40 in one non-limiting example and the Tangential Mach Number for the deswirled airflow 158 is reduced to less than 0.40 by the second swirler 100. Such a reduction in the rotational speed of the deswirled airflow 158 can retard vortex whistle under the disk 71 (FIG. 1) of the first stage of the turbine section 32 and minimize acoustic vibration. The retarded vortex whistle energy can be maintained below the threshold Tangential Mach Number necessary to induce interaction with the engine core 44.

In another example, the blades 124 can be angled at a higher blade angle 142, such as 75 degrees, and can increase the tangential speed of the deswirled airflow 158, effectively becoming a swirled airflow 158. For example, if the swirled airflow 152 is moving at twice the speed of the rotor 88, the second swirler 100, having blades angled at about 75 degrees can increase the tangential speed of the deswirled airflow to about 2.5 times the rotational speed of the rotor 88 as the swirled airflow 158.

Figure 7:
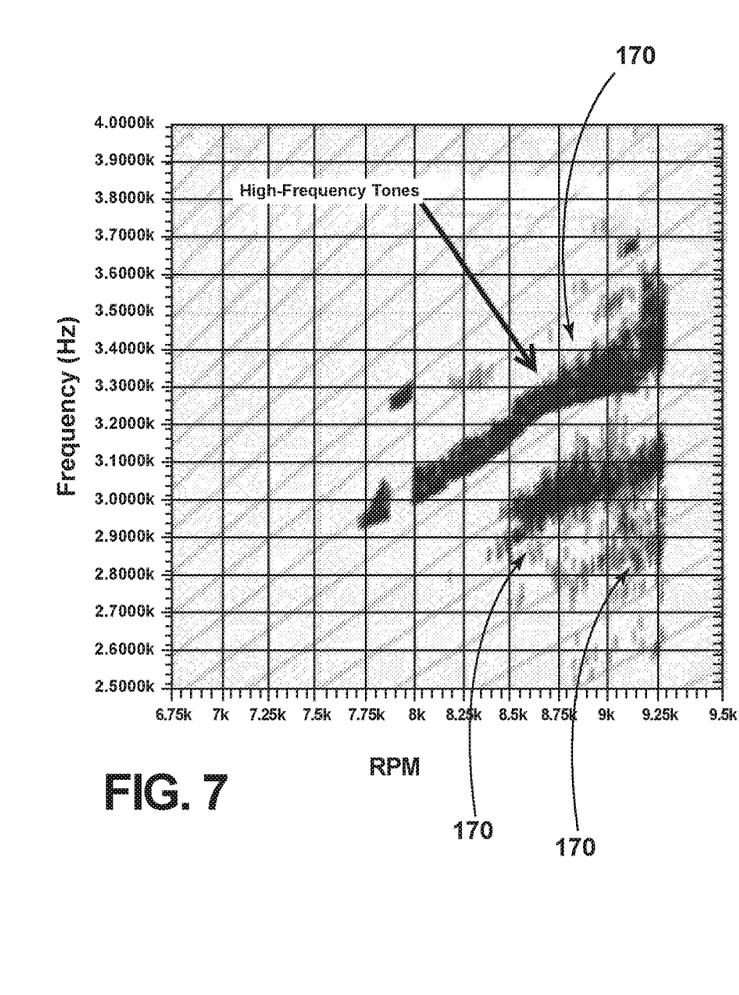
FIG. 7 is a plot illustrating acoustic vibrations generated by a turbine engine without the second swirler of FIG. 2.
Figure 8:
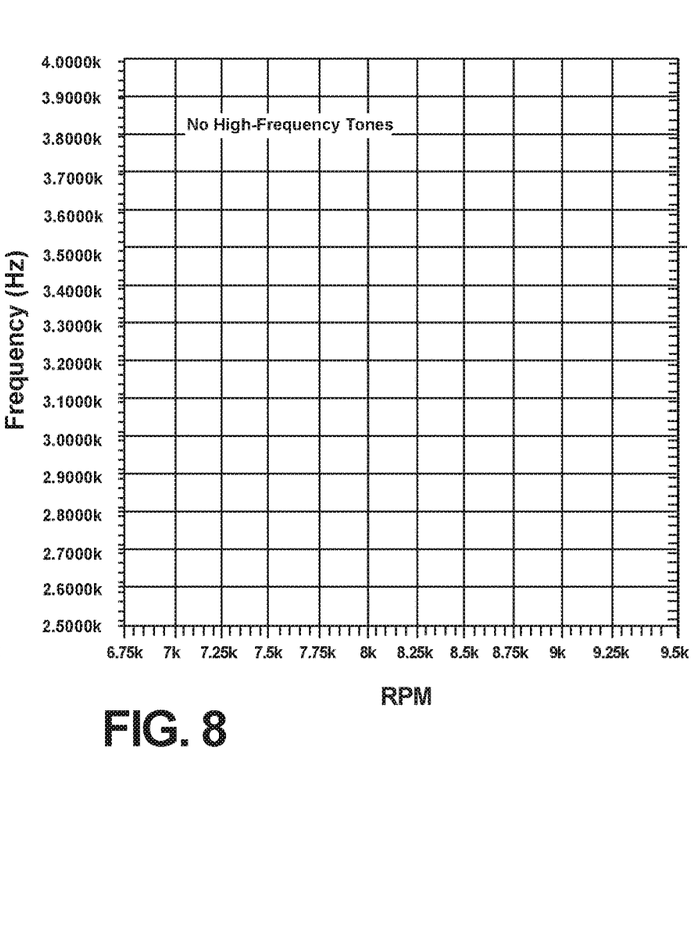
FIG. 8 is a plot illustrating the removed acoustic vibrations utilizing the second swirler of FIG. 3 downstream of the first swirler.

The swirling airflow 152 provided by the first swirler 98 minimizes losses associated with providing the swirling airflow 152 first stage of the turbine section 32. The second swirler 100 reduces the rotational speed of the swirled airflow 152 as the deswirled airflow 158 provided to the rotating disk 71 of the high pressure turbine section 34. Without deswirling the swirled airflow 152, the swirling airflow 152 can generate an airflow instability under the disk 71 as acoustic vibrations. Referring now to FIGS. 7 and 8, two plots illustrate such acoustic vibrations 170. The plots show measured frequencies within the swirler section 86 at a given rotational speed of the rotor 88. Such a frequency can be measured between about 2.5 k Hertz (Hz) and 3.7 k Hz at a rotational speed between about 7 k rpm and 9.5 k rpm, for example.

FIG. 7 is representative of an engine core 44 without a second swirler 100. As the swirled airflow 152 contacts the disk 71 of the first stage of the turbine section 34, a high frequency acoustic vibration 170 is generated from the disk 71. Such an acoustic vibration 170 can result in reduced efficiency of the bypass flow or can reduce lifetime of engine parts affected by the airflow instabilities. Thus, it is desirable to reduce or eliminate such an airflow instability. Turning to FIG. 8, illustrating the acoustic spectrum of an engine core 44 using the second swirler 100, it can be appreciated that excitation is removed in the exemplary plot. Thus, utilizing the second swirler 100 can increase the efficiency of the bypass flow at the disk 71 and nearby component lifetime.

It should be understood that reducing the Tangential Mach Number with the second swirler 100 reduces the tangential speed of the deswirled airflow 158 while maintaining the heightened rotational speed of the swirling airflow 152 provided from the first swirler 98 to the HP turbine 34. Such a reduction of the speed of the deswirled airflow 158 reduces airflow instability leading to harmonic vibration and potential resonance generated by the swirling airflow 152 otherwise contacting interior engine components, such as the disk 71 (FIG. 2), while continuing to providing an appropriate Tangential Mach Number to maintain the feed pressures necessary to provide a cooling airflow to downstream components, such as the rotating blades. In one specific example, maintaining the Tangential Mach Number below the threshold can minimize or eliminate acoustic vibration, harmonic vibration, or resonance occurring at natural system frequencies, such as a vortex whistle created at the first stage high pressure turbine disk 71.

It is contemplated that a method of swirling fluid within the turbine engine 10 can include swirling the fluid or airflow from a static portion of the turbine engine 10, such as the stator 92, into a rotor portion, such as the rotor 88, of the turbine engine 10 at a speed greater than the rotation of the rotor portion. The fluid can be swirled at the first swirler 98 as the swirling airflow 152 provided to the rotor portion. The method can further include deswirling the fluid into the interior of the rotor portion sufficient to maintain a predetermined Tangential Mach Number at the high pressure turbine 34. The deswirling can be accomplished with the second swirler 100 to reduce the Tangential Mach Number of the fluid provided from the first swirler 98. The method can include reducing the rotational speed of the fluid to prevent acoustic vibration, such as harmonic vibration, that can excite resonance of the rotor portion. Such a prevention can eliminate the incidence of vortex whistling of the rotor portion.

It should be appreciated that an excessive Tangential Mach Number can result in harmonic vibration or resonance, such as vortex whistle within the rotating parts of the high pressure turbine 34. Such resonance, for example, can occur at the high pressure turbine first stage disk 71. Utilizing a second swirler 100 to minimize the Tangential Mach Number provided to the high pressure turbine 34 can reduce or eliminate the incidence of vortex whistle, as well as any other harmonic vibration caused by excessive tangential Mach numbers within the rotor 88. Minimizing or eliminating vortex whistle or harmonic vibration can extend high pressure turbine 34 and rotor 88 lifetime while reducing overall maintenance.

It should be appreciated that application of the disclosed design is not limited to turbine engines with fan and booster sections, but is applicable to turbojets and turbo engines as well, or other engines utilizing swirling airflows.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A turbine engine comprising:
an engine core having a compressor section, a combustor section, and a turbine section in axial arrangement and defining an engine centerline, and which are operationally separated into a stator fixed about the centerline and a rotor rotatable about the centerline;
a first swirler provided on the stator for inducing rotation of an airflow passing through the engine core; and
a second swirler provided on the rotor downstream of and in fluid communication with the first swirler for reducing a rotational speed of the airflow from the first swirler;
wherein the second swirler includes a plurality of circumferentially spaced blades, with at least some of the circumferentially spaced blades are angled between 30 and 60 degrees relative to the engine centerline.

2. The turbine engine of claim 1 further comprising a shaft having a plurality of apertures with the shaft disposed between the first swirler and the second swirler.

3. The turbine engine of claim 1 wherein the blades are linear.

4. The turbine engine of claim 1 wherein the blades have an airfoil shape.

5. The turbine engine of claim 1 wherein the first swirler includes a plurality of circumferentially spaced vanes to induce circumferential rotation of the airflow.

6. The turbine engine of claim 1 wherein the first swirler induces rotation of the airflow to between 80-300% of the rotational speed of the rotor.

7. The turbine engine of claim 6 wherein the second swirler is a deswirler to reduce the rotational speed of the airflow from the first swirler.

8. The turbine engine of claim 1 wherein the second swirler is a deswirler.

9. The turbine engine of claim 1 wherein the second swirler reduces the rotational speed of the airflow below a predetermined threshold tangential Mach number.

10. The turbine engine of claim 9 wherein the predetermined threshold tangential Mach number is 0.4.

11. A turbine engine comprising a compressor section and a turbine section in axial arrangement and defining a stator and a rotor arranged about an engine centerline, with a first swirler provided with the stator for inducing a rotation on an airflow, and a second swirler provided with the rotor downstream of the first swirler for changing a rotational speed of the airflow provided from the first swirler, wherein the second swirler includes a plurality of circumferentially spaced blades angled to increase the rotational speed of the airflow provided from the first swirler.

12. The turbine engine of claim 11 wherein at least some of the blades are angled at 75 degrees relative to the engine centerline.

13. The turbine engine of claim 11 wherein the first swirler induces rotation of the airflow to between 80-300% of the rotational speed of the rotor.

14. A method of swirling a fluid within a turbine engine, the method comprising:
swirling the fluid from a static portion of the turbine engine into a rotor portion of the turbine engine at a speed greater than the rotor portion to define a first swirled flow; and
swirling the first swirled flow within an interior of the rotor portion and to maintain a predetermined Tangential Mach Number of 0.4 at a high pressure turbine.

15. The method of claim 14 wherein swirling the fluid further includes reducing a rotational speed of the fluid to match the rotational speed of the rotor portion at a first stage of the high pressure turbine.

16. The method of claim 14 wherein swirling the fluid further includes reducing a rotational speed of the fluid below a threshold tangential Mach number.

* * * * *